United States Patent [19]

Inoue

[11] Patent Number: 5,309,227
[45] Date of Patent: May 3, 1994

[54] VIDEO SIGNAL PROCESSING SYSTEM FOR ELECTRONIC ENDOSCOPE

[75] Inventor: Kiyoshi Inoue, Omiya, Japan

[73] Assignee: Fuji Photo Optical Co., Ltd., Omiya, Japan

[21] Appl. No.: 73,616

[22] Filed: Jun. 8, 1993

Related U.S. Application Data

[63] Continuation of Ser. No. 748,961, Aug. 23, 1991, abandoned.

[30] Foreign Application Priority Data

Aug. 24, 1990 [JP] Japan .................................. 2-221225

[51] Int. Cl.⁵ .............................................. H04N 7/18
[52] U.S. Cl. ........................................ 348/71; 348/441
[58] Field of Search ...................... 358/98, 11, 21 R

[56] References Cited

U.S. PATENT DOCUMENTS

| | | | |
|---|---|---|---|
| 4,875,091 | 10/1989 | Yamada | 358/98 |
| 4,933,758 | 6/1990 | Saito | 358/98 |
| 5,021,870 | 6/1991 | Motoe et al. | 358/11 |
| 5,034,888 | 7/1991 | Uehara et al. | 358/98 |

Primary Examiner—Howard W. Britton
Assistant Examiner—A. Au
Attorney, Agent, or Firm—Oblon, Spivak, McClelland, Maier & Neustadt

[57] ABSTRACT

A video signal processing system for electronic endoscope, employing a high-sensitivity solid-state image sensor device having an approximately doubled sensitivity along with improved dynamic range and RGB spectral sensitivity ratios and reduced to about ½ in size as compared with conventional endoscopic solid-state image sensor devices, the system being arranged to read out therefrom an A-field signal having a preceding line added to each scanning line and a B-field signal having a succeeding line added to each scanning line, store the A- and B-field signals in a field memory, and read out the A- and B-field signals alternately line by line from the field memory as picture data to improve the RGB spectral sensitivity ratios.

4 Claims, 8 Drawing Sheets

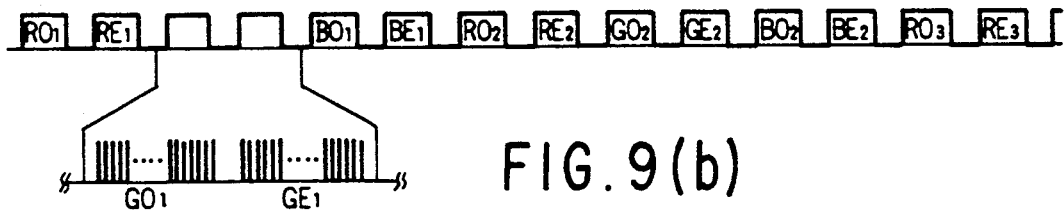
FIG. 9(a)
FIG. 9(b)
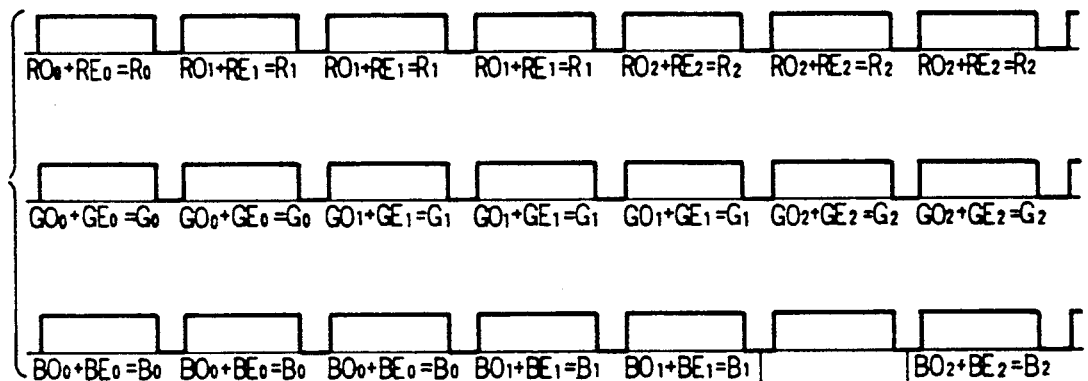
FIG. 9(c)
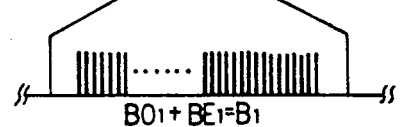
FIG. 9(d)

VIDEO SIGNAL PROCESSING SYSTEM FOR ELECTRONIC ENDOSCOPE

This application is a Continuation of U.S. application Ser. No. 07/748,961, filed on Aug. 23, 1991, now abandoned.

BACKGROUND OF THE INVENTION

1. Field of the Art

This invention relates to a video signal processing system to be used for processing video signals from a solid state image sensor device mounted on an electronic endoscope.

2. Prior Art

Electronic endoscopes have a solid image sensor device like a CCD incorporated into a tip end portion of an insert body to be inserted into an intracorporeal or intracavitary portion which needs examination, thereby picking up the image of the intracavitary portion of interest and displaying the image in color on a monitor screen. Because of the darkness of the intracavitary portion to be examined or diagnosed, it is necessary for an electronic endoscope to be equipped with an illumination means. For this purpose, the endoscope is connected to a light source and is internally provided with a light guide to transmit illuminating light from the light source to the tip end of the insert portion, illuminating an intracavitary portion of interest through a window provided at the distal end of the insert body.

In this manner, under illumination with light from the light source, the image of an intracavitary portion of interest is formed on the solid image sensor device by way of storage of signal charges in the respective picture elements which constitute the solid image sensor device, while reading out the signal charges to a signal processor. The solid image sensor device which is employed in an image pickup system of this sort is normally of a single element type for the purpose of minimizing the diameter of the insert body of the endoscope, and is generally driven by a sequential field system to obtain three field signals of red (R), green (G) and blue (B), which are synthesized into color video signals for display on a monitor screen.

The insert body of the endoscope, which is designed for insertion into narrow intracavitary portions, is desired to be as small as possible in diameter to lessen patient's pains and to improve its operationability at the time of insertion. However, since the insert body is densely packed with various component parts, the reduction of its diameter is naturally limited by the necessity for securing spaces for the component parts to be built in the insert portion. This applies especially to electronic endoscopes which need to allot a relatively broad space for a solid-state image sensor device, which is mounted at the fore end of the insert body along with other component parts of the image pickup system. The solid-state image sensor is usually provided with a wiring pattern and is mounted on a circuit board together with other components parts. It follows that the outer diameter of the highly packed tip end portion determines the thickness of the insert body as a whole, and minimization of the component parts of the image pickup system is extremely important to the reduction of the diameter of the entire insert body.

SUMMARY OF THE INVENTION

It is therefore an object of the present invention to provide a video signal processing system for an electronic endoscope, which contributes to the reduction in size of component parts of the image pickup system to be built into a tip end portion of an insert body of the endoscope.

It is another object of the present invention to provide a video signal processing system for an electronic endoscope, which permits a significant reduction in size of the solid-state image sensor device without entailing deteriorations in its sensitivity and resolution.

In accordance with the present invention, there is provided, for achieving the above-stated objectives, a video signal processing system for an electronic endoscope, including a solid-state image sensor device, a video processor for reading out signal charges from the solid-state image sensor device under sequential RGB illuminations, and a field memory for storing output data of the video processor, reading out from the solid-state image sensor an A-field signal having a preceding line added to each scanning line and a B-field signal having a succeeding line added to each scanning line, storing the A- and B-field signals in the field memory, and reading out the A- and B-field signals alternately line by line from the field memory as picture data to be displayed on a monitor.

BRIEF DESCRIPTION OF THE DRAWINGS

The above and other objects, features and advantages of the invention will become apparent from the following description and appended claims, taken in conjunction with the accompanying drawings of preferred embodiments which are given only for the purpose of illustration and should not be construed as limitative of the invention. In the accompanying drawings:

FIGS. 2 through 5 show the prior art, of which FIG. 2 is a schematic illustration of a light source;

FIG. 3 is a schematic view of a color wheel;

FIG. 4 is a circuit diagram of a signal processor; and

FIG. 5 shows various characteristics diagrams, i.e., at (a) a diagram of irradiation periods of illuminating light, at (b) a diagram of video processor output signals, at (c) a diagram of memory output signals and at (d) a diagram of color encoder output signals;

FIGS. 6 through 9 illustrate a first embodiment of the invention, of which FIG. 6 is a circuit diagram of a signal processor;

FIG. 7 is a diagrammatic illustration explanatory of the operation of CCD;

FIG. 8 is a schematic view of a color wheel; and

FIG. 9 shows various characteristics diagrams, i.e., at (a) a diagram of irradiation periods of illuminating light, at (b) a diagram of video processor output signals, at (c) a diagram of memory output signals and at (d) a diagram of color encoder output signals.

DESCRIPTION OF PREFERRED EMBODIMENTS

Figure 1:
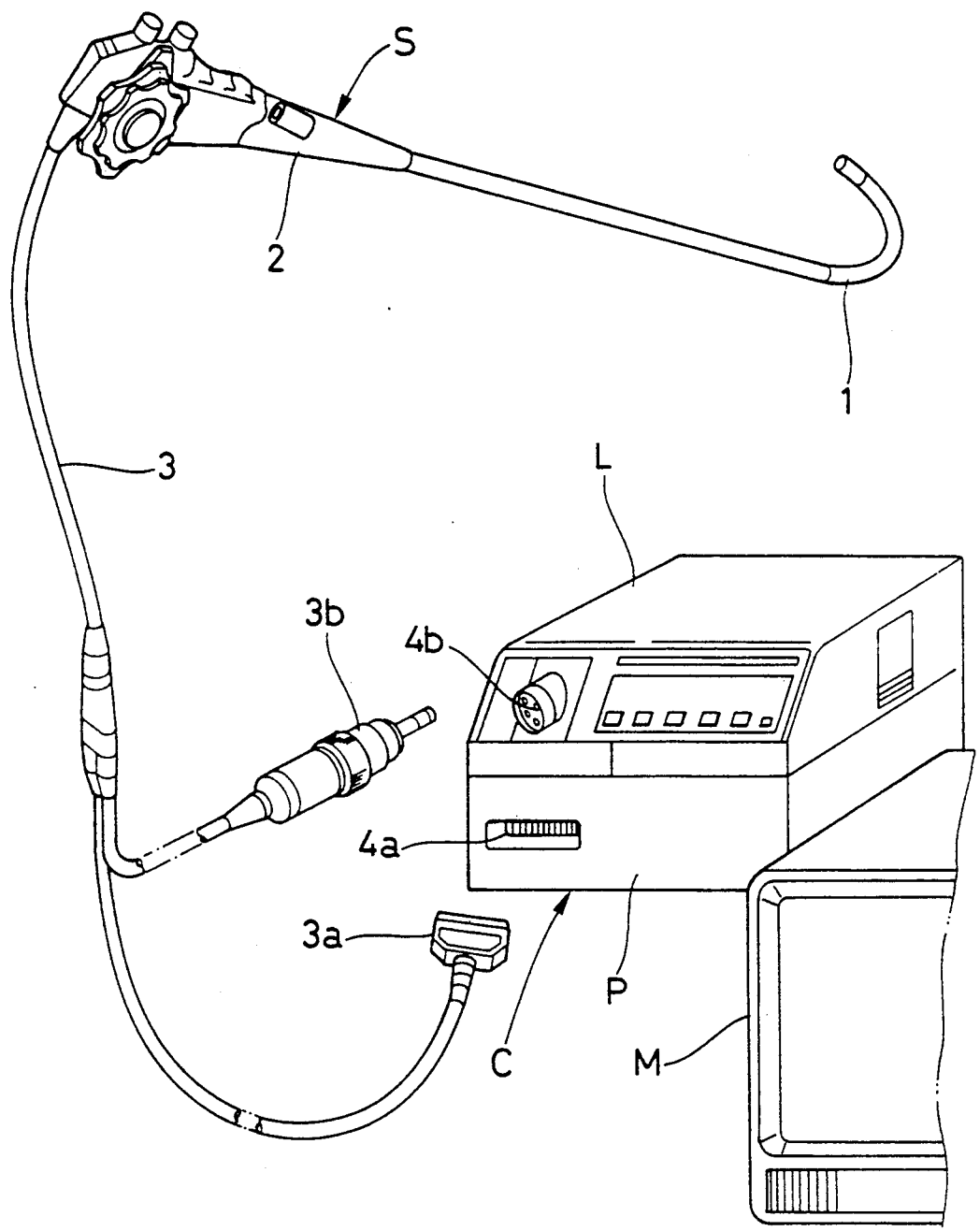
FIG. 1 is a schematic illustration of the general system arrangement of an electronic endoscope.

Generally, an electronic endoscope system is largely constituted by an endoscope S, a control unit C and a monitor M as shown schematically in FIG. 1. The endoscope S has a insert body 1 to be inserted into an intracavitary portion or the like, an operating section 2 connected to the base end of the insert body 1, and a universal cable 3 interconnecting the operating section 2 and the control unit C. The control unit C is constituted by a video signal processor P and a light source L.

The endoscope S is provided with an illumination window and a viewing window at the tip end of the insert body 1. The light emitting end of a light guide is directed toward the illumination window to transmit illuminating light therethrough, and a solid-state image sensor device like a CCD is provided in the viewing window at the focal plane of an objective lens. The endoscope construction in this regard is well known in the art, and therefore its details are omitted in the drawings and following description.

The cable from the image sensor device and the light guide are passed through the insert body 1 of the endoscope S and the universal cable 3 via operating section 2. The universal cable 3 is bifurcated into a branch with an electric connector 3a which detachably connects the cable from the image sensor device to the video signal processor of the control unit C, and a branch with an optical connector 3b which is connectible to the light source L of the control unit C. Provided on the part of the control unit C are sockets 4a and 4b to be coupled with the electrical and optical connectors 3a and 3b, respectively.

Aside from the above-described general arrangement of the electronic endoscope, particular arrangements in a typical prior art electronic endoscope are discussed below before going into the description of preferred embodiments of the invention, as the video signal processor of the invention will be best understood by comparison with a conventional counterpart.

Figure 2:
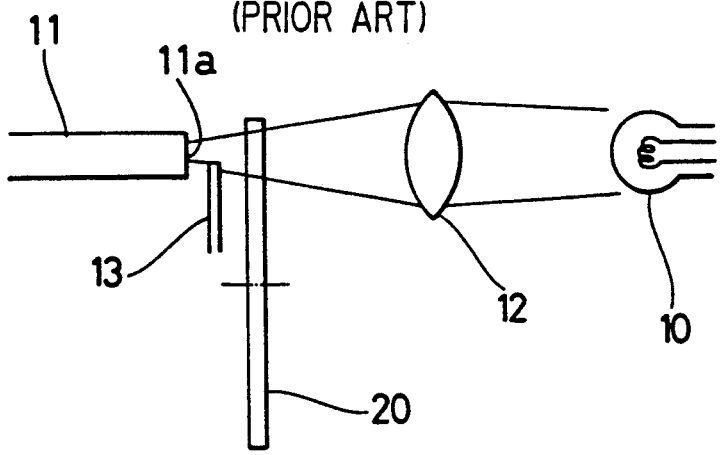

As shown in FIG. 2, the light source L which is built in the control unit C includes a source lamp 10 and a condenser lens 12 which is located in the path of illuminating light from the source lamp 10 to converge the light toward a light guide 11. For the purpose of controlling the light intensity according to the location of a target portion of examination, a stop member 13 is interposed between the source lamp 10 and condenser lens 12. Further, a rotary color filter 20 is located in an intermediate position between the condenser lens 12 and a light receiving end of the light guide 11.

Figure 3:
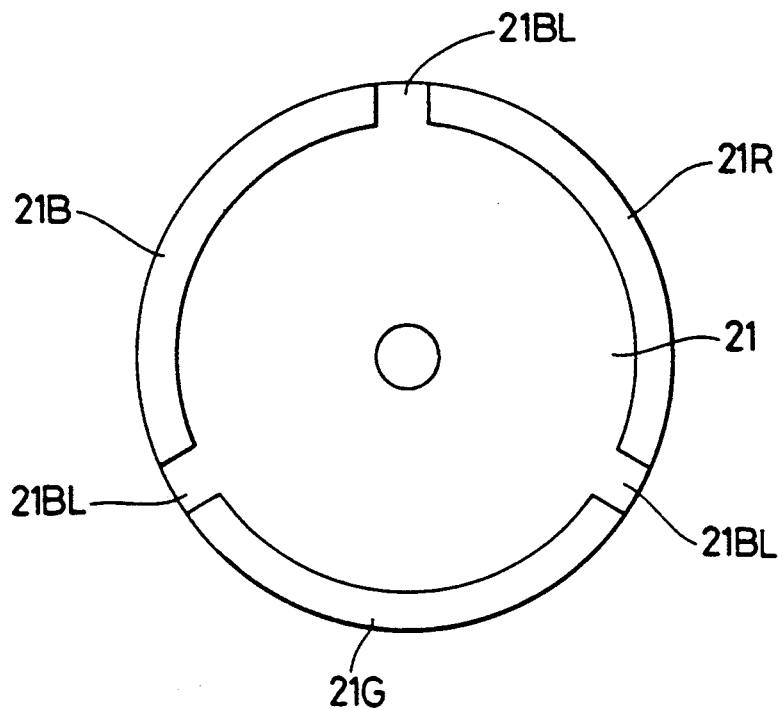

The rotary color filter 20 serves to filter white light from the source lamp 10 before introduction to the light receiving end of the light guide 11. According to a prior art arrangement, the rotary color filter 20 is provided with a color wheel 21 with an arcuate filtration track as shown in FIG. 3. The color wheel 21 is formed with filter areas 21R, 21G and 21B which selectively pass light of R, G and B wavelengths, respectively. The adjacent filter areas are separated from each other by a blank light shielding area 21BL. The color wheel 21 is mounted on a rotational shaft 22 which is driven from a motor 23, for sequential irradiations with light of R, G and B wavelengths.

Figure 4:
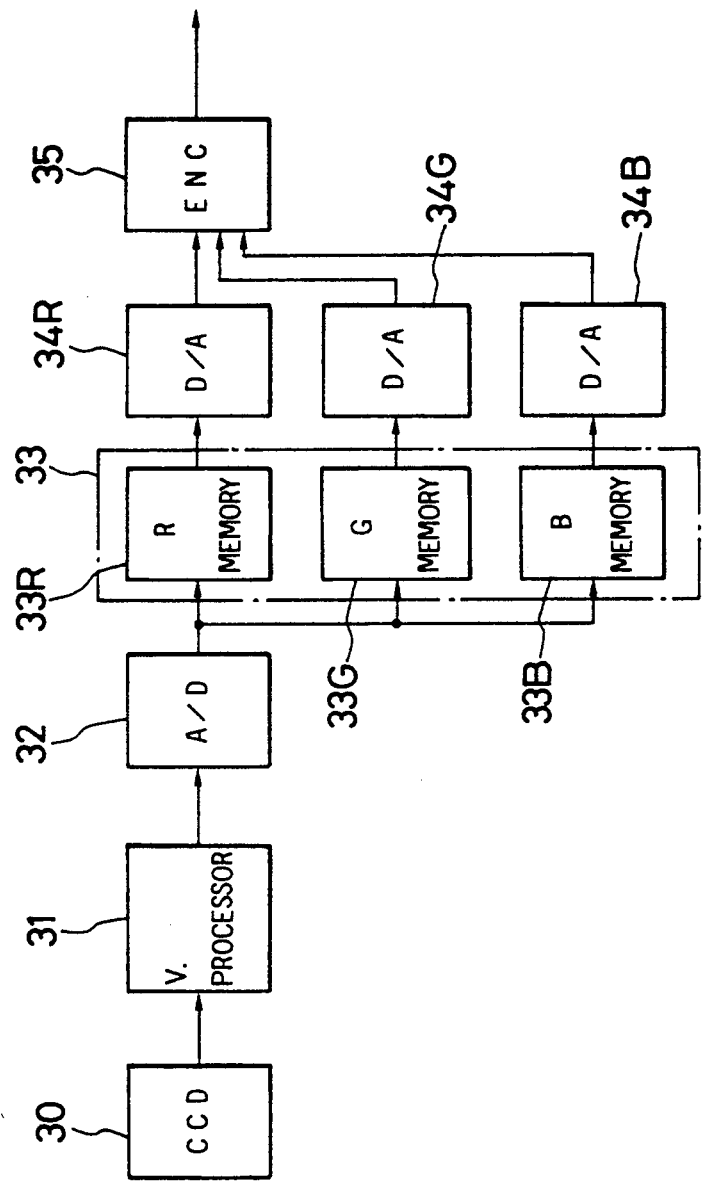

Referring to FIG. 4, there is shown the circuit arrangement of the prior art video signal processor P.

CCD 30, a solid-state image sensor, is mounted on a tip end portion of the insert body 1 of endoscope S. The signals from CCD are passed successively through the insert body 1 of the endoscope S, operating section 2 and universal cable 3 for transmission to the video signal processor P of the control unit C via the electrical connector 3a.

Figure 5A:
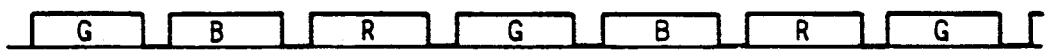
Figure 5B:
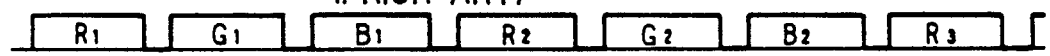

For picking up an image of a subject through CCD 30, the subject is irradiated with illuminating light from the light source L which projects light of RGB wavelength regions sequentially at predetermined time intervals as shown in FIG. 5(a), while exposing CCD 30 to reflected light from the subject. Signal charges of CCD 30 are read out while the blank light shielding zone 21BL is in the path of the illuminating light. The signals read out from CCD 30 in this manner are sent to the video processor 31 which, after the known signal processing operations such as clamping, blanking, gamma correction, enhancement and white balance, sequentially produces picture signals of R, G and B colors as shown in FIG. 5(b).

The output signals of the video processor 31 are converted into digital signals through A/D converter 32 and sequentially written in R memory area 33R, G memory area 33G and B memory area 33B of the field memory 33. As soon as one frame of data of each color are received, they are read out simultaneously through D/A converters 34R, 34G and 34B and mixed through color encoder 35 to produce composite video signals of NTSC standards or the like.

Figure 5C:
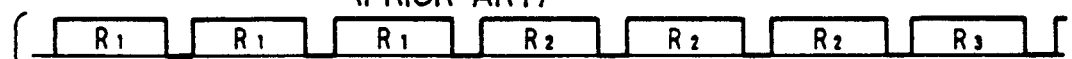
Figure 5C:
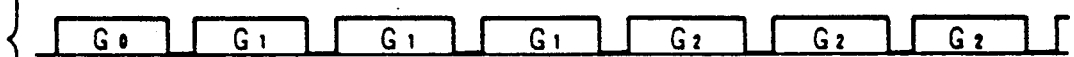
Figure 5C:
Figure 5D:
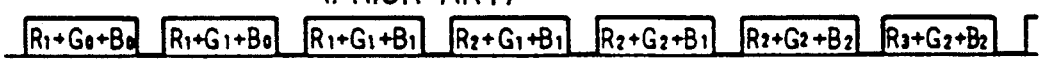

As seen in FIG. 5(c), the signal read out to the color encoder 35 is renewed with respect to the picture data of one color R, G or B while the data of the other two colors are of the previous field which is currently stored in the field memory 33. The composite video signal produced by the color encoder 35 consists of a combination of RGB picture signals as shown in FIG. 5(d), for color display on the monitor screen.

In most cases, the solid-state image sensor generally adopted for an endoscope is a frame transfer CCD having a storage area with substantially a half number of picture elements in the vertical direction, in terms of the light receiving area. Therefore, in reading out picture data of each color, it is the usual practice to resort to a picture element add-on reading procedure by which two picture elements are added together in the vertical direction.

Generally, in mixing two picture elements in the vertical direction by the interlacing action, there can be obtained two kinds of field signals, namely, an A-field signal having a preceding line added to each scanning line and a B-field signal having a succeeding line added to each scanning line, displaying an image by interlaced scanning according to the two kinds of field signals. Certain endoscopes, however, are arranged to read out only one of the two field signals, for example, only an A-field signal.

In this connection, as explained hereinbefore, the endoscope which is designed to be inserted into an intracavitary portion or the like is desired to be as small as possible in outer diameter of the insert body for smooth passage through a narrow constricted portion or for lessening patient's pains, or in consideration of the operationability at the time of insertion. For these reasons, there has been a strong demand for minimization of the solid-state image sensor device like CCD, a major component part of the image pickup system, which is mounted on the tip end portion of the insert body. In this regard, it is conceivable to reduce the size of the solid-state image sensor device by reducing the number of picture elements or the area of each unit picture element which constitutes the image sensor. However, the reduction of the number of picture elements will invite a problem of low resolution, while there are limits to the reduction of the areas of the unit picture elements in consideration of degradations in sensitivity and dynamic range.

On the other hand, the recent development of high-sensitivity solid-state image sensor devices has almost doubled sensitivity as compared with conventional CCDs, in addition to improvements in dynamic range and RGB spectral sensitivity ratios. Therefore, as an image sensor, the invention employs a CCD 40 which is approximately two times higher in sensitivity than the above-described conventional CCD but is approximately half in the number of picture elements as well as in vertical dimensions of both light-receiving and storage areas. In order to secure satisfactory resolution in the horizontal direction, it is preferred to be substantially the same number of picture elements in the horizontal direction as the conventional CCD 30. The adoption of CCD 40 makes it possible to minimize the circuit board on which the image sensor is to be mounted, and therefore to assemble other associated parts into the tip end portion of the insert body 1 in a minimized and compact form as a whole. Such a half-size high-sensitivity CCD 40, however, needs a signal processing system which is different from the system for CCD 30.

Figure 6:
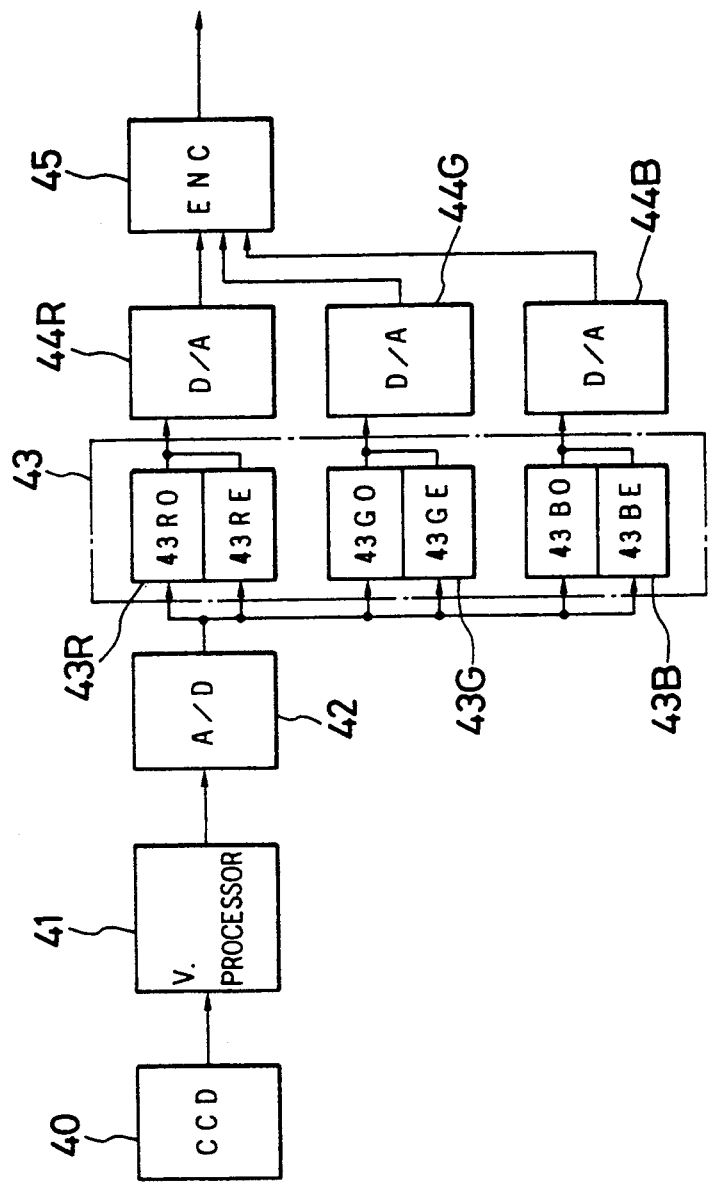

In this regard, FIG. 6 shows the general arrangement of a video signal processing system according to the present invention, in which indicated at 40 is a CCD, at 41 is a video processor for processing signals from CCD 40, at 42 an A/D converter, at 43 a field memory for storing signals from A/D converter 42, at 44R, 44G and 44B are D/A converters, and at 45 is a color encoder.

Figure 8:
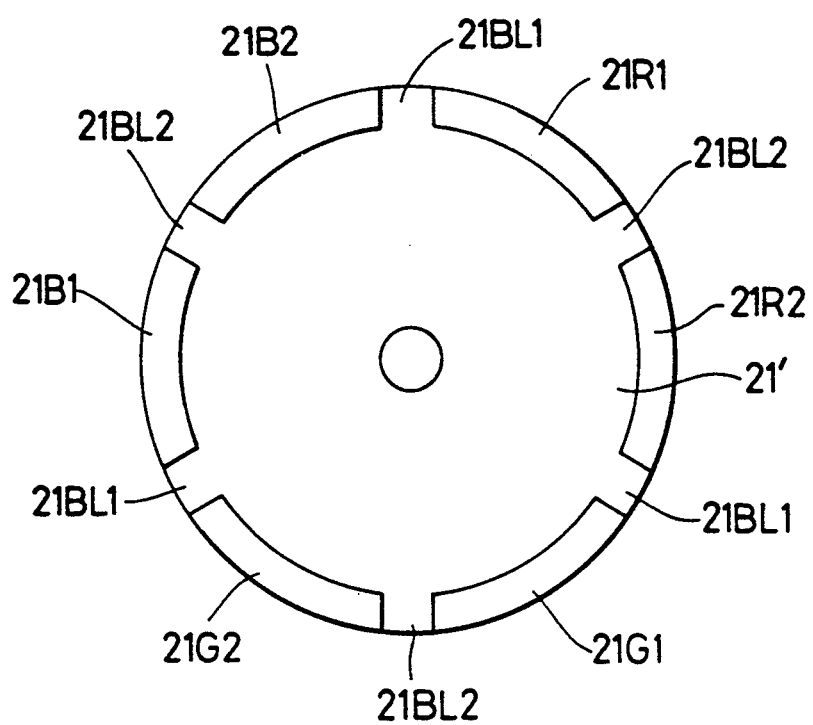

With a high-sensitivity CCD of the sort as mentioned above, the time of irradiation by illuminating light suffices to be half of the irradiation time for CCD 30. Therefore, a color wheel is rotated at a double speed in case it is of the conventional construction as described hereinbefore. Alternatively, there may be employed a color filter which is provided with RGB filter areas in pairs contiguously to blank light shielding areas BL1 and BL2, namely, with paired filter areas 21R1, 21R2, 21G1, 21G2, 21B1 and 21B2 as shown particularly in FIG. 8 to filter out selectively R, G and B light components respectively.

Accordingly, CCD 40 is exposed in the irradiation periods in which the filter areas 21R1, 21R2, 21G1, 21G2, 21B1 and 21B2 come into the path of illuminating light, and signal charges are read out in a dousing period when the blank light shielding areas 21BL1 and 21BL2 come into the illuminating light path and sent to the video processor 41 to undergo predetermined signal processing operations. In this instance, in reading out signal charges from CCD 40 which has a half number of picture elements in the vertical direction as compared with the conventional CCD 30, vertically adjacent scanning lines are added together by the picture element add-on procedure for the purpose of improving dynamic range and S/N ratio. However, a frame of picture signals, resulting from the double-line reading or the picture element add-on procedure, normally suffers from a considerable degradation in vertical resolution.

Figure 7:
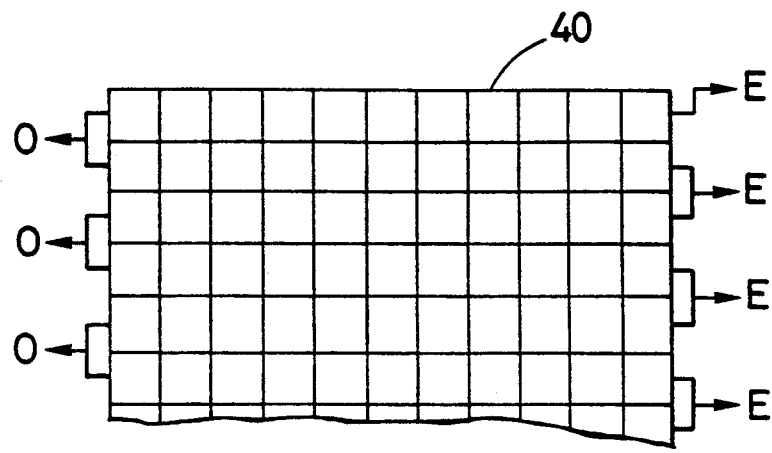

In order to solve this problem, R-filter, G-filter and B-filter areas are provided in pairs on the color wheel, and as shown in FIG. 7 a preceding line is added to each scanning line when reading out signals in a dousing period following an irradiation period, for example, of the first R-filter area as indicated in a left portion of the same figure to obtain A-field signal. In a dousing period following the irradiation period of the second R-filter area, the lines are added in a different combination when reading out the signals, namely, a succeeding line is added to each scanning line to obtain a B-field signal. Similarly, by successive illuminations through the G- and B-filter areas, A- and B-field signals of the respective colors are sequentially obtained. For the sake of convenience of explanation, A-field and B-field are referred to as an odd-number field and an even-number field in the following description, respectively.

As shown in FIG. 9(a), during one revolution of the color wheel, the irradiation by illuminating light of each of R, G and B wavelength regions is repeated twice at a predetermined time interval, exposing CCD 40 in each of the irradiation periods. While driving CCD 40 by such a system, signals are read out to the video processor 41. As shown in FIG. 9(b), in a time period corresponding to one field of CCD 30, the video processor 41 produces an output signal which consists of a series of RGB picture data containing odd- and even-number field data for each color. This output signal is digitized through A/D converter 42, and written in RGB memory areas 43R, 43G and 43B. These memory areas 43R, 43G and 43B may be divided into odd number memory areas 43RO, 43GO and 43BO and even-number memory areas 43RE, 43GE and 43BE, respectively. However, practically the odd- and even-number memory areas are defined by addresses, so that there is no need for physically splitting each memory area in halves. The data in the memory areas 43R, 43G and 43B are renewed frame by frame, namely, by frame of each color which consists of the odd- and even-number fields, in the manner known in the art.

In reading out the picture data of the respective colors, which have been written in the field memory 43 in the above-described manner, the data in the odd- and even-number memory areas are read out alternately line by line. As shown in FIG. 9(c), the picture data of the respective colors are simultaneously read out to the color encoder 45 through the D/A converters 44R, 44G and 44B. As a result, the color encoder 45 produces composite video signals of the odd- and even-number fields as shown in FIG. 9(d), for displaying a color image on the monitor screen.

The above-described system arrangement permits to pick up images of a subject without substantial degradations in resolution, as compared with the prior art CCD 30. Besides, dynamic range and RGB spectral sensitivity ratios become even better. Further, the reduction of the number of picture elements to ½ in the vertical direction leads to a substantial reduction in size. In this regard, it is to be noted that, in case of an endoscope, even a slight reduction in outer diameter of the insert body has conspicuous effects in use, and such a reduction of the CCD size is extremely advantageous.

Figure 10:
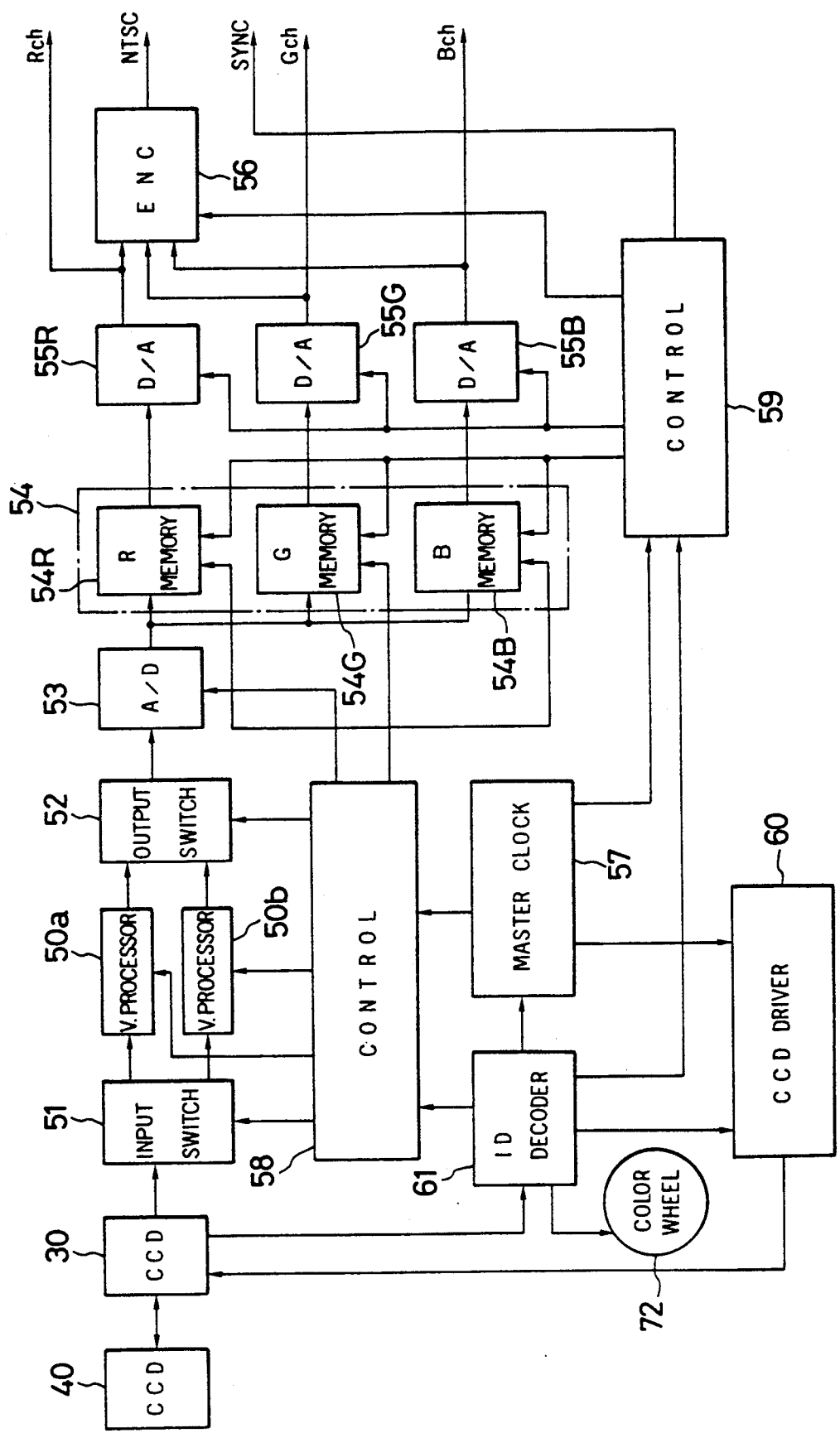
FIG. 10 is a circuit diagram of a signal processor in a second embodiment of the invention.

Referring now to FIG. 10, there is shown a second embodiment of the invention, which is arranged to make the control unit C compatible with both an endoscope with ordinary CCD 30 and an endoscope with half-size high-sensitivity CCD 40. In order to use the control unit C commonly for different types of image sensors CCD 30 and CCD 40, it is necessary for the video data processing circuitry to be commonly operable for the video data of these CCDs as much as possible.

Namely, considering the clamp pulse width, a video processor of different arrangement is added for processing the output signal of CCD 30 or CCD 40 depending upon the type of the solid-state image sensor device. In this instance, video processors 50a and 50b are provided for CCD 30 and CCD 40, respectively, selecting either the video processor 50a or 50b through an input switch 51.

An output switch 52 is provided posterior to the output stages of the video processors 50a and 50b, so that the output data of the selected video processor 50a or 50b are transferred to the field memory 54 through A/D converter 53 and written in the RGB memory areas 54R, 54G and 54B. The data in the memory areas 54R, 54G and 54B of the field memory 54 are concurrently read out to the color encoder 56 through D/A converters 55R, 55G and 55B, respectively, thereby to produce composite video signals.

Thus, although the video processor of the image pickup system needs a different circuit arrangement for a different type of solid-state image sensor, the circuitry of the display system, including A/D converter 53, field memory 54, D/A converters 55R, 55G and 55B and color encoder 56, can be commonly used for CCD 30 and CCD 40 except the read-out control for the field memory 54. In addition, the master clock circuit 57, which generates clock pulses for the control of the video signal processing system as a whole, can also be commonly used.

Further, for the image pickup system which employs the video processors 50a and 50b exclusively for the different types of image sensors, it is necessary to use different pulses in writing the output signals of the respective video processors in the field memory 54. Therefore, the control means 58 needs to be arranged to switch its control signal to a CCD 30 control signal or to a CCD 40 control signal. Similarly, the control means 59 of the display system, which produces composite video signals on the basis of the picture data read out from the field memory 54, needs to be arranged to switch its control signal to a CCD 30 control signal or to a CCD 40 control signal at the time of reading out signals from the field memory 54. Further, CCD driver 60 is arranged to generate two kinds of pulse signals on the basis of the clock pulses from the master timer 57.

Accordingly, control means 58 and 59 and CCD driver 60 are switchable between a CCD 30 drive mode and a CCD 40 drive mode. To this end, an ID mechanism is provided to automatically detect the type of the endoscope which is connected to the control unit C, namely, to detect whether the connected endoscope is of CCD 30 type or CCD 40 type.

The ID mechanism includes an ID member such as an ID pin provided on the electric connector 3a of the universal cable 3, and an ID decoder 61 which is provided on the part of the control unit C. As soon as the ID decoder 61 detects the type of the connected endoscope, a switch control signal is sent to the control means 58 and 59 of the image pickup and display systems and to the CCD driver 60 according to the detection signal from the ID decoder 61.

Further, to be compatible with both CCD 30 and CCD 40, the illumination system needs to be able to switch its illumination mode between the CCD 30 illumination mode of FIG. 5(a) and the CCD 40 illumination mode of FIG. 9(a). For this purpose, arrangements may be made to rotate the color wheel of the rotary filter at a double speed, or alternatively a couple of filter tracks may be provided concentrically on a single color wheel which is adapted to shift its position for the switch of the illumination mode.

Accordingly, when an endoscope with CCD 30 is connected to the control unit C, this is detected by ID decoder 61 and, according to the signal from ID decoder 61, the control means 58 and 59 and CCD driver 60 are put in CCD 30 drive mode, while shifting the color wheel to a corresponding position to operate the illumination system in the CCD 30 mode of FIG. 5(a).

On the other hand, when an endoscope of CCD 40 type is connected to the control unit C, this is detected by ID decoder 61 to switch the control means 58 and 58 and CCD driver 60 into the drive mode for half-size high-sensitivity CCD 40, while shifting the color wheel to bring the corresponding filter track into alignment with the path of illuminating light. In this case, as shown in FIG. 9(a), two consecutive irradiations by each of R, G and B wavelengths take place during one revolution of the color wheel.

The signals from CCD 30 and CCD 40 are processed in the same way as in the prior art system and the first embodiment of the invention discussed hereinbefore, and here the description on this point is omitted to avoid repetitions.

Although the number of picture elements of CCD 40 is reduced approximately to ½ of that of CCD 30 in the foregoing embodiments, it may be reduced to ⅓ or ¼ if desired. Further, in place of the frame transfer type CCD, there may be employed a frame interline transfer type CCD or an interline type CCD.

What is claimed is:

1. A video signal processing system for an electronic endoscope, comprising:
   a solid-state image sensor device;
   a video processor for reading out signal charges from said solid-state image sensor device under sequential RGB illuminations;
   a field memory means for storing output data of said video processor;
   control means for reading out from said solid-state image sensor device an A-field signal having a preceding line added to each scanning line and a B-field signal having a succeeding line added to said each scanning line, for storing the A-field and B-field signals in said field memory means, and for reading out the A-field and B-field signals alternately line by line from said field memory means as picture data; and
   display means for displaying said picture data.

2. A video signal processing system as defined in claim 1, wherein said sequential RGB illuminations are repeated consecutively a couple of times in obtaining one frame of picture data.

3. A video signal processing system for an endoscope, comprising:
   a control means compatible with both: a first system employing a single solid-state image sensor device for producing picture data on the basis of one of two different field signals obtained from picture data of each primary color; and a second system employing a high-sensitivity solid-state image sensor device having a half number of picture elements as compared with said single solid-state image sensor device of said first system and, said second system comprising first reading means for reading out from said high-sensitivity solid-state image sensor an A-field signal having a preceding line added to each scanning line and a B-field signal having a succeeding line added to said each scanning line, storing means for storing said A-field and B-field signals in a field memory means, and second reading means for reading out said A-field and B-field signals alternatively line by line from said field memory means as picture data to be displayed on a monitor.

4. A video signal processing system as defined in claim 3, further comprising a circuitry arranged to use an A/D converter, a field memory means, D/A converters, a color encoder and master clock circuit commonly for processing video signals from said solid-state image sensor devices of said first and second systems.

* * * * *